(12) United States Patent
Godin et al.

(10) Patent No.: US 7,609,730 B2
(45) Date of Patent: Oct. 27, 2009

(54) HIGH SPEED MULTIPLEXER WITH PARALLEL ARCHITECTURE

(75) Inventors: Jean Godin, Saint Maur des Fosses (FR); Agnieszka Konczykowska, L'Hay les Roses (FR)

(73) Assignee: Alcatel (FR)

( * ) Notice: Subject to any disclaimer, the term of this patent is extended or adjusted under 35 U.S.C. 154(b) by 546 days.

(21) Appl. No.: 11/583,893

(22) Filed: Oct. 20, 2006

(65) Prior Publication Data

US 2007/0090977 A1 Apr. 26, 2007

(30) Foreign Application Priority Data

Oct. 21, 2005 (FR) .................................. 05 10777

(51) Int. Cl.
*H04J 3/02* (2006.01)
(52) U.S. Cl. ..................................... 370/537
(58) Field of Classification Search ....................... None
See application file for complete search history.

(56) References Cited

U.S. PATENT DOCUMENTS

| | | | | |
|---|---|---|---|---|
| 4,092,491 A | * | 5/1978 | Frazer | 375/283 |
| 4,566,092 A | * | 1/1986 | Gerard et al. | 369/59.19 |
| 4,567,602 A | * | 1/1986 | Kato et al. | 375/296 |
| 5,825,807 A | | 10/1998 | Kumar et al. | |
| 7,406,104 B2 | * | 7/2008 | Yang et al. | 370/509 |
| 2003/0165341 A1 | * | 9/2003 | Bulow | 398/75 |
| 2004/0227649 A1 | * | 11/2004 | Mauro et al. | 341/69 |

FOREIGN PATENT DOCUMENTS

| EP | 1 026 863 A | 8/2000 |
|---|---|---|
| EP | 1026863 A2 | 9/2006 |
| EP | 1026863 A3 | 12/2006 |

* cited by examiner

*Primary Examiner*—Raj Jain
(74) *Attorney, Agent, or Firm*—Lowe Hauptman Ham & Berner, LLP

(57) ABSTRACT

The field of the invention is that of electronic or electro-optical multiplexers for the transmission of digital data at high speed. The device according to the invention makes it possible to multiplex two NRZ-type, binary-coded signals. It mainly comprises: • A generator of four primary signals; • Means of electronically selecting said primary signals controlled by the two initial signals for generating the final multiplexed signal. The selection means are complemented with a logic block for generating four logic signals, all different, dependent on the two initial signals. The main advantage of this device is to allow for the use of so-called ETDM technologies for the transmission of high-speed multiplexed signals inasmuch as the necessary logic circuits operate mainly at a frequency half that of the multiplexed signal. These electronic transmission technologies are less expensive than the so-called OTDM optical technologies.

5 Claims, 4 Drawing Sheets

HIGH SPEED MULTIPLEXER WITH PARALLEL ARCHITECTURE

BACKGROUND OF THE INVENTION

1. Field of the Invention

The field of the invention is that of electronic multiplexers for the transmission of digital data at high speed.

2. Description of the Prior Art

To minimize the number of digital data transmission cables, there is an interest in multiplexing the data so as to have one and the same cable carry several digital signals. To multiplex digital data, there are various types of techniques available. One of these techniques that is commonly employed is called TDM, standing for Time-Division Multiplexing. The principle of this technique is illustrated in FIG. 1 in the case of the transmission of two signals $D_{f1}$ and $D_{f2}$. The two digital signals having the same rate F are time-division multiplexed by a multiplexer M which transmits a single digital signal $D_M$ at a rate 2F over a single channel L, this signal $D_M$ is then demultiplexed by a demultiplexer DEM to restore the two initial signals $D_{O1}$ and $D_{O2}$ to the rate F. Generally, the multiplexed signal $D_M$ is obtained by interleaving the initial signals, every other bit of the multiplexed signal corresponding, for example, to the bits of the first signal $D_{f1}$, the other bits of the multiplexed signal corresponding to those of the second signal $D_{f2}$.

When the multiplexed signal $D_M$ is transmitted by optical pathways, the multiplexing means are either optical means or electronic means. In the first case, the term OTDM, standing for Optical Time-Division Multiplexing, is used. In the second case, the term ETDM, standing for Electrical Time-Division Multiplexing, is used.

The ETDM technologies are less expensive than the OTDM technologies which are normally reserved for very high speed transmissions. The ETDM technologies are currently limited to 80 gigabits per second. They normally use technologies:

For the lower rates, based on Silicon-(Bi)-CMOS, standing for Complementary Metal Oxide Semiconductor;
For the higher rates, based on SiGe, GaAs or InP.

Currently, there is a growing need for transmissions at very high rates, greater than 80 Gbits/s, a rate that is not easily accessible to ETDM technologies.

SUMMARY OF THE INVENTION

Thus, the device according to the invention makes it possible simply to double the multiplexing capabilities of the current ETDM technologies. There can thus be obtained high rates corresponding to the current telecommunication needs using less expensive technologies. Naturally, the invention can also apply to the OTDM technologies.

More specifically, the subject of the invention is an electronic circuit for time-division multiplexing two initial NRZ-type, binary-coded signals, each bit of the signals having a duration T, the two signals being able to take respective values defining four states denoted "0, 0", "0, 1", "1, 0", "1,1", said circuit comprising at least:

A generator of four primary signals respectively associated with these said four states:
A first continuous primary signal of amplitude corresponding to the "0" binary level;
A second continuous primary signal of amplitude corresponding to the "1" binary level;
A third periodic primary signal comprising a succession of bits alternating between the "0" and "1" binary levels, each bit of said third signal having a duration T/2, half the duration of the bits of the initial signals;
A fourth periodic primary signal comprising a succession of bits alternating between the "0" and "1" binary levels, each bit of said fourth signal having a duration T/2, half the duration of the bits of the initial signals, said fourth signal being phase-shifted by a duration of one bit relative to the third signal;
Electronic selection means controlled by the two initial signals for generating a final signal from the four primary signals, said means being arranged so that, for each duration T for which the two signals define a given state, the final signal results from the selection during this duration of the one of the four primary signals that is associated with said given state.

Typically, the output signal is equal to:
The first primary signal if the state of the initial signals is "0, 0";
The second primary signal if the state of the initial signals is "1, 1";
The third primary signal if the state of the initial signals is "1, 0";
The fourth primary signal if the state of the initial signals is "0, 1".

The other "primary signal-state" associations do, however, remain possible. It is then appropriate in each case for the chosen association to be taken into account in the demultiplexing operations performed on reception.

Advantageously, the electronic circuit comprises a logic block for generating four logic signals, respectively associated with the four states of the initial signals, a logic state of a logic signal being 1 when the initial signals define a state associated with said logic signal and 0 in the other cases; the selection means can comprise means for calculating the sum of the four products of the logic signals by the primary signals.

Advantageously, the signals are optical signals and the selection means are electronically-controlled optical gates.

BRIEF DESCRIPTION OF THE DRAWINGS

The invention will be better understood and other advantages will become apparent from reading the description that follows, given by way of non-limiting example, and using the appended figures in which.

MORE DETAILED DESCRIPTION

Figure 1:
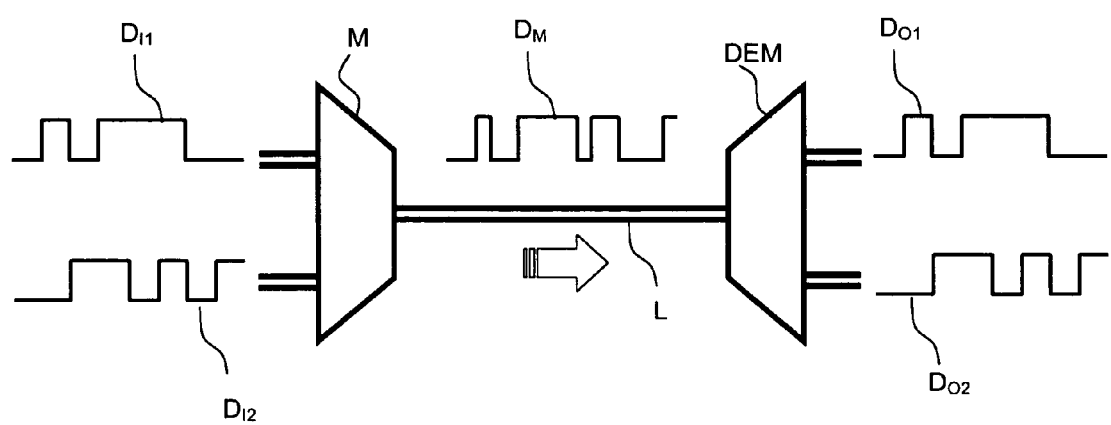
FIG. 1 represents the general principle of a two-channel multiplexing/demultiplexing assembly.
Figure 2:
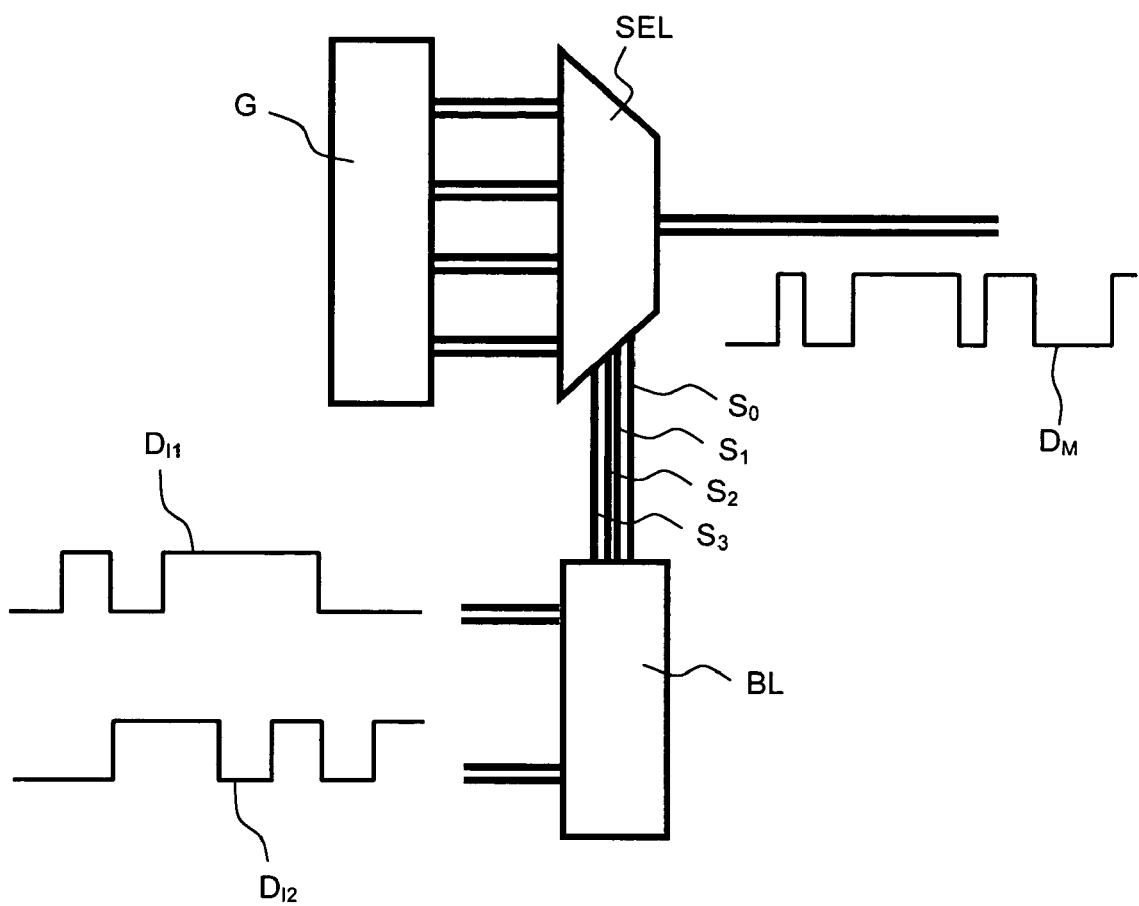
FIG. 2 represents the general principle of the multiplexing circuit according to the invention.

FIG. 2 represents the general principle of the multiplexing circuit according to the invention, for multiplexing two initial NRZ (Non-Return to Zero) type, binary-coded signals $D_{f1}$ and $D_{f2}$. The bits that make up these signals have a temporal duration T corresponding to a rate F equal to 1/T. The multiplexing circuit mainly comprises:

A generator G of four primary signals;
Electronically-activated means SEL of selecting said primary signals controlled by the two initial signals $D_{f1}$ and $D_{f2}$ for generating the final multiplexed signal $D_M$.

As an example, the control of the selection means is obtained via a logic block BL for generating four logic signals, all different, $S_0$, $S_1$, $S_2$ and $S_3$, dependent on the two initial signals $D_{I1}$ and $D_{I2}$.

Figure 3:
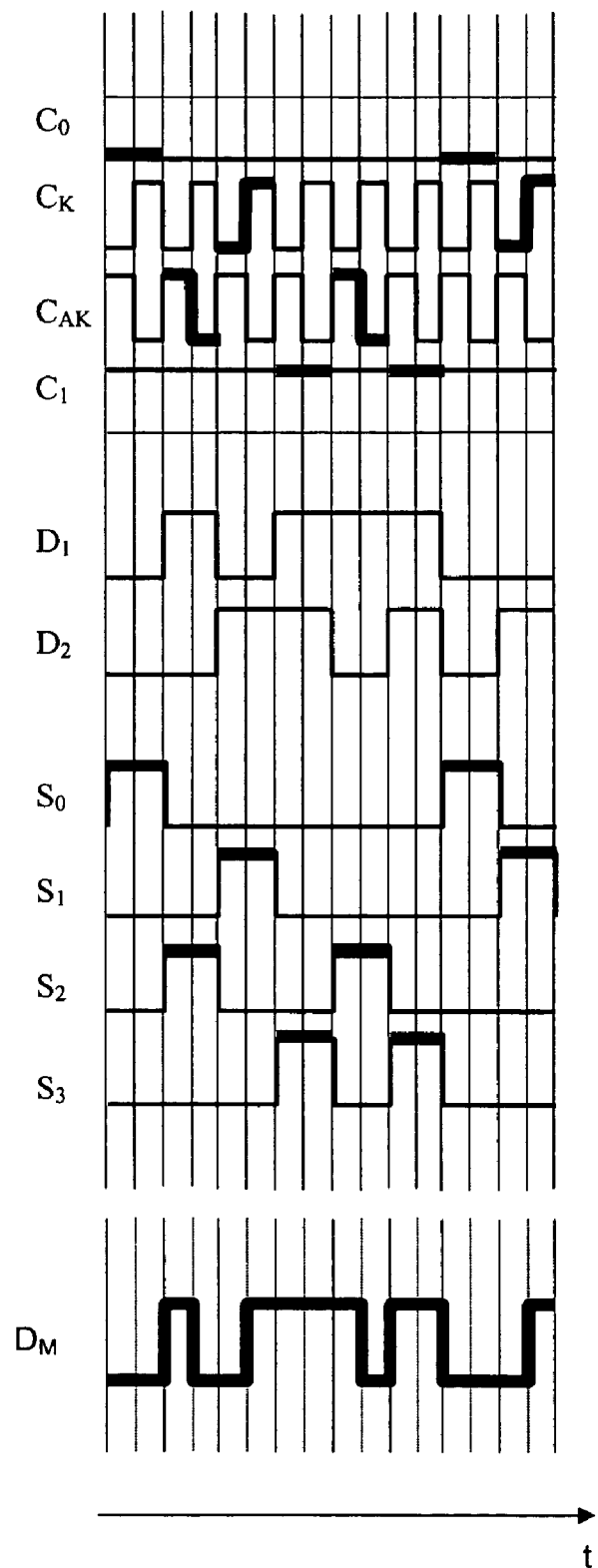
FIG. 3 represents the temporal variations of the different signals implemented by the multiplexing circuit according to the invention.

FIG. 3 represents the temporal variations of the different signals necessary to the invention in the case of two signals $D_{I1}$ and $D_{I2}$. In this figure, the time t is on the X axis and the intensity of the various signals on the Y axis. The fine vertical lines are separated by a duration equal to a half-period T/2. The thick parts of the signals D and C represent the useful parts used to "construct" the multiplexed signal.

As illustrated in FIG. 3, the four primary signals obtained from the generator G are as follows:

A first continuous primary signal $C_0$, of amplitude corresponding to the "0" binary level;

A second continuous primary signal $C_1$, of amplitude corresponding to the "1" binary level;

A third periodic primary signal $C_K$ comprising a succession of bits alternating between the "0" and "1" binary levels, each bit of said third signal having a duration T/2, half the duration of the bits of the initial signals;

A fourth periodic primary signal $C_{AK}$ comprising a succession of bits alternating between the "0" and "1" binary levels, each bit of said fourth signal having a duration T/2, half the duration of the bits of the initial signals, said fourth signal being phase-shifted by a duration of one bit relative to the third signal.

Of course, the generation of the first two signals $C_0$ and $C_1$ poses no technical problem. Although the signals $C_K$ and $C_{AK}$ are at a frequency twice that of the initial signals, their generation also poses no technical problems inasmuch as they correspond to simple periodic signals that can be generated at high frequency.

During a period T, the pair of signals $D_{I1}$ and $D_{I2}$ can have only one of the following four possible states: "0, 0", "0, 1", "1, 0", "1, 1". Consequently, the multiplexed signal corresponding to these two signals necessarily corresponds to one of the four primary signals.

The object of the selection means is to select the correct primary signal corresponding to the different states of the initial signals. To this end, it is possible to use a logic block which, based on the initial signals, generates four logic signals $S_0$, $S_1$, $S_2$ and $S_3$, respectively associated with the four states of the initial signals, the logic state of a logic signal being 1 when the initial signals define a state associated with said logic signal and 0 in the other cases. These signals are represented in FIG. 3. For example, $S_0$ is "1" when the two signals $D_{I1}$ and $D_{I2}$ are "0, 0" and $S_0$ is "0" when the two signals $D_{I1}$ and $D_{I2}$ are "0, 1", "1, 0" and "1, 1". The generation of these logic signals, which is done at the frequency F, poses no technical implementation problems.

Thus, the four logic signals are representative of the state of the signals $D_{I1}$ and $D_{I2}$. Each of the four logic signals controls the selection of one of the four primary signals. The selected primary signal corresponds to the state of the signals $D_{I1}$ and $D_{I2}$. As an example, the logic operation performed is as follows:

$$D_M = C_0 \cdot S_0 + C_K \cdot S_1 + C_{AK} \cdot S_2 + C_1 \cdot S_3$$

The synchronization of the primary signals $C_K$ and $C_{AK}$ relative to the selection signals is essential to the correct operation of the circuit. So-called D flip-flop (D.FF) devices can be used to resolve this problem. It is, however, possible that the transitions between the succession of the primary signals forming the multiplexed signal are not perfect. In this case, they can be filtered at the output of the selection means.

It is also possible to use another arrangement. In practice, the multiplexed signal is made up of the succession of the bits $B_{D1}$ of the first signal $D_1$ followed by the bits $B_{D2}$ of the second signal $D_2$ to form the temporal succession $B_{D1}$–$B_{D2}$–$B_{D1+T}$–$B_{D2+T}$–$B_{D1+2T}$ . . .

The multiplexed signal can be obtained in a different way. Each bit $B_{D2}$ of the second signal $D_2$ is delayed by a temporal duration equal to the duration of one bit. The result is a delayed signal $D_{2-T}$. A multiplexed signal is then produced by the succession of the bits $B_{D2-T}$ of the delayed signal followed by the bits $B_{D1}$ of the signal $D_1$ to form the temporal succession $B_{D2-T}$–$B_{D1}$–$B_{D2}$–$B_{D1+T}$–$B_{D2+T}$ . . . This second multiplexed signal is, as can be seen, identical to the first, apart from a temporal delay equal to a half-period. However, it has been generated from different primary signals which add a noise that is necessary different from that of the initial multiplexed signal. By summing these two multiplexed signals, the noise is thus reduced significantly.

Figure 4:
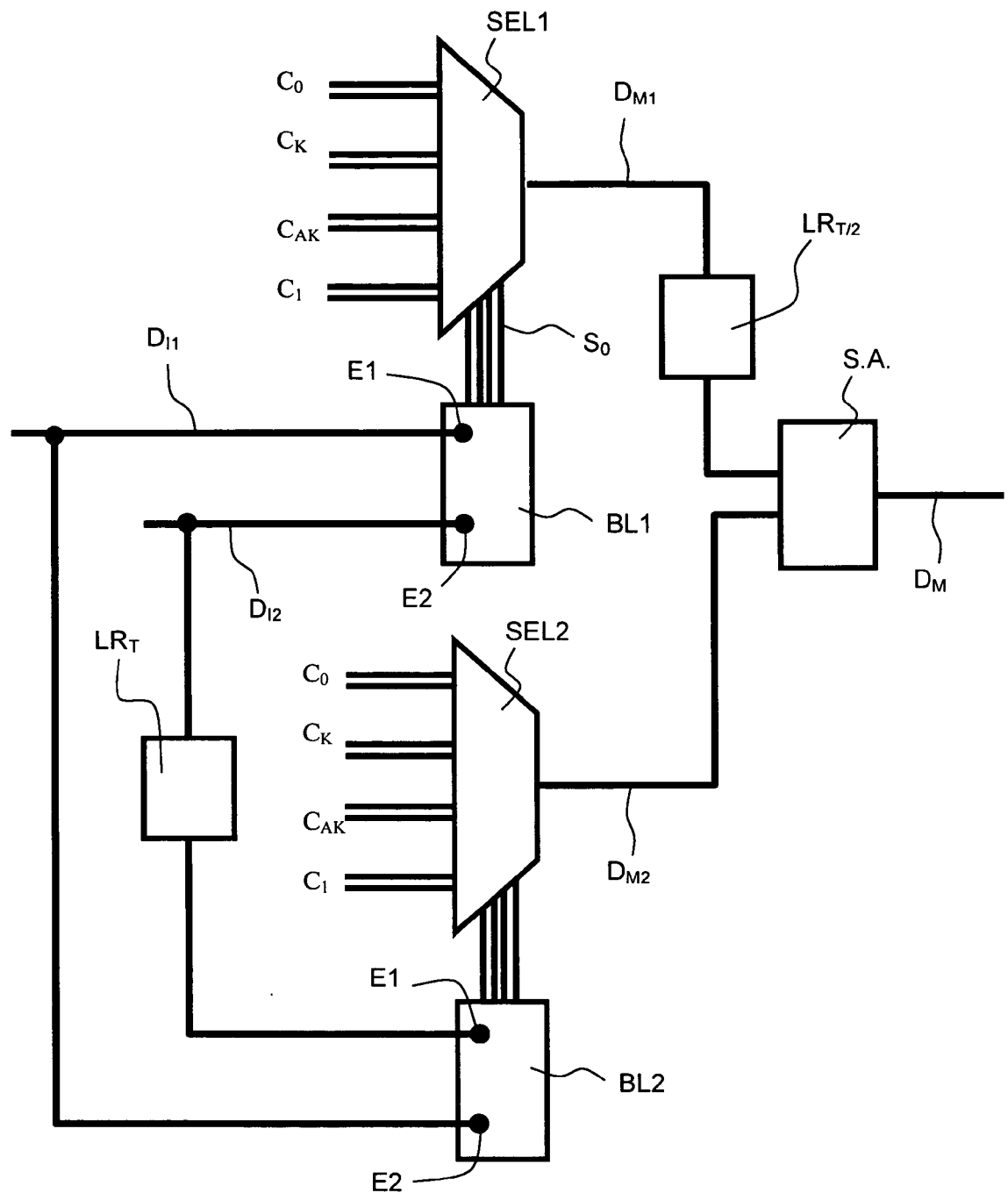
FIG. 4 represents a variant of the multiplexing device according to the invention.

As an example, the device represented in FIG. 4 makes it possible to carry out this function. It comprises:

A generator G of the four primary signals $C_0$, $C_1$, $C_K$ and $C_{AK}$;

Two logic blocks BL1 and BL2;

Two selection means SEL1 and SEL2 linked to the generator and to the logic blocks;

Two delay circuits, the first LRT generating a first delay equal to a period T and the second $LR_{T/2}$ generating a second delay equal to a half-period T/2;

An analogue summer S.A.

Operation is as follows:

Each logic block has two inputs denoted E1 and E2. The assembly is such that, in the time-division multiplex obtained from each selection means SEL1 or SEL2, the bits corresponding to the signal received by the first input E1 of the associated logic block BL1 or BL2 precede those corresponding to the signal received by the second input E2. The signals $D_1$ and $D_2$ are respectively connected to the inputs E1 and E2 of the logic block BL1 and are respectively connected to the inputs E2 and E1 of the logic block BL2, the signal D2 being delayed in this case by a period T by the first delay circuit $LR_T$.

The logic blocks BL1 and BL2 each generate four logic signals $S_0$, $S_1$, $S_2$ and $S_3$ which control the primary signals of the selectors SEL1 and SEL2.

At the output of the selectors, two multiplexed signals are obtained, $D_{M1}$ and $D_{M2}$, identical but phase-shifted by a half-period. The second delay circuit is used to put them in phase and the analogue summer to add them together. A multiplexed signal $D_M$ is then obtained, with reduced noise.

The circuits according to the invention can be implemented by conventional electronic means on initial electronic signals.

It is also possible to perform a multiplexing producing an optical multiplex from optical primary signals obtained by means, for example, of electro-optical modulators. In this latter case, the selection means are electronically-controlled optical gates.

What is claimed is:

1. An electronic multiplexing circuit for time-division multiplexing two initial NRZ-type, binary-coded signals, each bit of the signals having a duration T, the two signals being able to take respective values defining four states denoted "0, 0", "0, 1", "1, 0", "1, 1", said circuit comprising:

a generator of four primary signals respectively associated with said four states:

a first continuous primary signal of amplitude corresponding to the "0" binary level;

a second continuous primary signal of amplitude corresponding to the "1" binary level;

a third periodic primary signal comprising a succession of bits alternating between the "0" and "1" binary levels, each bit of said third signal having a duration T/2, half the duration of the bits of the initial signals;

A fourth periodic primary signal comprising a succession of bits alternating between the "0" and "1" binary levels, each bit of said fourth signal having a duration T/2, half the duration of the bits of the initial signals, said fourth signal being phase-shifted by a duration of one bit relative to the third signal; and electronic selection means for selecting said primary signals controlled by the two initial NRZ signals for generating a final multiplexed signal from the four primary signals, said means being arranged so that, for each duration T for which the two initial NRZ signals define a given state, the final multiplexed signal results from the selection during the duration T of the one of the four primary signals that is associated with said given state.

2. The electronic multiplexing circuit according to claim 1, wherein the association between the primary signals and the states of the initial signals is as follows:
first primary signal associated with the state "0, 0";
second primary signal associated with the state "1, 1";
third primary signal associated with the state "1, 0";
fourth primary signal associated with the state "0, 1".

3. The electronic multiplexing circuit according to claim 1, wherein the electronic circuit further comprises a logic block for generating four logic signals, respectively associated with the four states of the initial signals, the logic state of a logic signal being 1 when said initial signals define a state associated with said logic signal and 0 in other cases.

4. The electronic multiplexing circuit according to claim 3, wherein the selection means comprise means for calculating the sum of the four products of the logic signals by the primary signals.

5. The electronic multiplexing circuit according to claim 1, wherein the signals are optical signals and the selection means are essentially electronically-controlled optical gates.

* * * * *